US010878218B2

(12) United States Patent
Whelan, III et al.

(10) Patent No.: US 10,878,218 B2
(45) Date of Patent: Dec. 29, 2020

(54) DEVICE FINGERPRINTING, TRACKING, AND MANAGEMENT

(71) Applicant: salesforce.com, inc., San Francisco, CA (US)

(72) Inventors: John M. Whelan, III, San Francisco, CA (US); Bharath Kumar Pareek, San Francisco, CA (US); Amarjit Singh, San Francisco, CA (US); Pohsuen Kuo, San Francisco, CA (US); Birva Joshi, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 238 days.

(21) Appl. No.: 16/010,987

(22) Filed: Jun. 18, 2018

(65) Prior Publication Data

US 2019/0384956 A1 Dec. 19, 2019

(51) Int. Cl.
G06F 21/00 (2013.01)
G06K 9/00 (2006.01)
G06F 21/62 (2013.01)
G06F 21/32 (2013.01)
G06F 16/783 (2019.01)

(52) U.S. Cl.
CPC ........... *G06K 9/001* (2013.01); *G06F 16/783* (2019.01); *G06F 21/32* (2013.01); *G06F 21/6263* (2013.01); *G06K 9/00107* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen |
| 6,161,149 A | 12/2000 | Achacoso et al. |

(Continued)

Primary Examiner — Maung T Lwin
(74) Attorney, Agent, or Firm — Schwabe Williamson & Wyatt

(57) ABSTRACT

Methods for tracking and managing a device that connects to a database system, including connecting to a web application at least partially running on the database system, are disclosed. In some embodiments, the device may be identified by a fingerprint or unique device identifier (ID) formed from various vectors that correspond to device specific attributes or characteristics. The fingerprint or unique device ID may be compared to a fingerprint or device ID stored on the database system associated with a user's access credentials to determine a match percentage. Further access by the device to the database system may depend upon whether the match percentage exceeds a predetermined threshold. Device access to the database system may be tied to the fingerprint or unique device ID.

20 Claims, 7 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,984,628 B2 * | 3/2015 | Mahaffey .............. G06F 21/564 726/22 |
| 9,003,488 B2 * | 4/2015 | Spencer ................. H04W 8/22 726/3 |
| 2001/0044791 A1 | 11/2001 | Richter et al. |
| 2002/0072951 A1 | 6/2002 | Lee et al. |
| 2002/0073046 A1 * | 6/2002 | David .................... G06Q 20/12 705/67 |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2007/0150743 A1* | 6/2007 | Weatherford ......... G06F 21/606 713/184 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0198537 A1* | 8/2012 | Grube ................... G06F 3/0604 726/9 |
| 2012/0233137 A1 | 9/2012 | Jakobson et al. |
| 2012/0290407 A1 | 11/2012 | Hubbard et al. |
| 2013/0046992 A1* | 2/2013 | Resch ................... H04L 9/0877 713/176 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0066015 A1* | 3/2014 | Aissi ....................... G06F 21/57 455/411 |
| 2014/0250490 A1* | 9/2014 | Baca ................... H04L 63/0263 726/1 |
| 2014/0359537 A1 | 12/2014 | Jackobson et al. |
| 2015/0237038 A1* | 8/2015 | Grajek ................... H04L 67/10 726/8 |
| 2015/0312243 A1* | 10/2015 | Ponsford ............. G06F 21/6218 713/159 |
| 2016/0112870 A1* | 4/2016 | Pathuri ................. H04W 12/04 726/4 |
| 2018/0322501 A1* | 11/2018 | Eisen ..................... G06Q 20/34 |
| 2019/0268329 A1* | 8/2019 | Toth ........................ G06F 21/35 |

* cited by examiner

DEVICE FINGERPRINTING, TRACKING, AND MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems and cloud services, and in particular to systems and methods for device fingerprinting, and tracking and management of the device using the fingerprint.

BACKGROUND

As computing increasingly moves to cloud-based and other distributed networked-based services and storage, security and privacy concerns take on an ever-greater importance. Various web services offered across a wide range of industries may employ a two-factor identification scheme, where, in addition to the ubiquitous username and password combination, a code or token may be sent to a known or trusted device associated with the username and password combination that is typically in the physical possession of the user. Other additional security steps may be employed in addition or alternatively to a two-factor scheme. This additional authentication requirement helps thwart would-be hackers who may have been able to gain a user's username and password information via online sources, but are highly unlikely to have also gained access to the user's physical device or other authentication information.

Because such additional authentication schemes are inherently slower than just entering a username and password combination, requiring additional authentication measures or steps is typically reserved for the first time a user signs into a cloud service or other web platform from a particular device, application and/or web browser. The web platform or cloud service may be configured to automatically detect a login attempt from an unrecognized device, app or browser. Following the initial login and authentication, a user may be given an option to trust the device, app and/or software, whereupon the cloud service or web platform tags the device, app and/or software as recognized. In addition to helping to prevent hacking, authenticated and trusted devices may be tracked in subsequent logins following the initial login and authentication process, which may facilitate device management.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
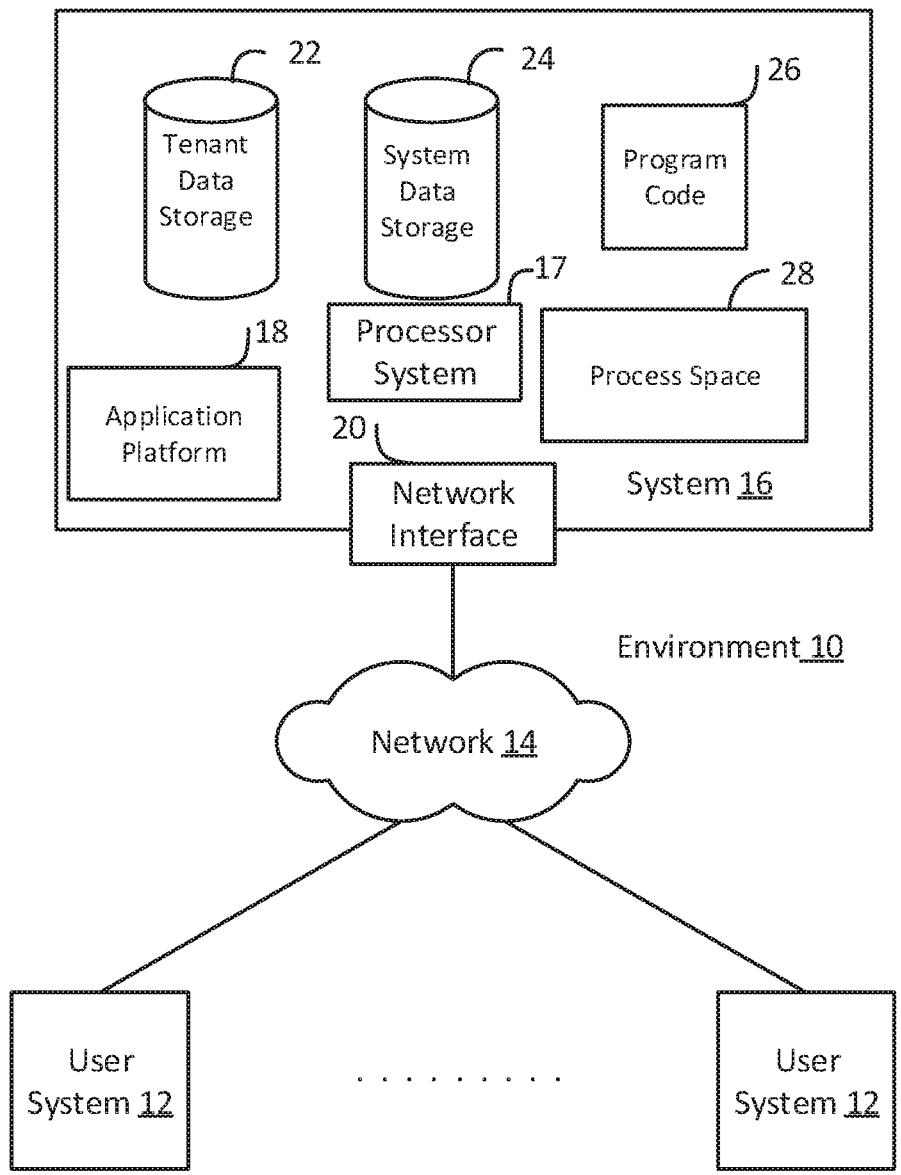
FIG. 1A shows a block diagram of an example environment in which an on-demand database service can be used according to some implementations.

Embodiments discussed herein provide methods and systems for software platforms, database systems, and similar online or distributed systems to track and manage devices, such as mobile devices including smartphones and tablets, as well as desktop and laptop computers. Other embodiments may be described and/or claimed.

Many modern cloud services, such as online database systems, multi-tenant systems, and other web-accessible sites that may offer an array of information, including interactions that involve sensitive information such as health, business, financial, and personal sites, employ security measures to detect when a user's account has possibly been compromised, such when an unauthorized third party (e.g. a hacker) gains knowledge of the user's username and password combination. One such method involves detecting when an attempt is first made to access a service from a given device, and invoking an additional authentication step such as a two-factor authentication process, or, in other implementations, either limiting or simply denying access to the service until the given device is separately authorized. Implementing such a method may require identifying a device attempting to access the service and checking whether the device has been previously used in connection with the provided username and password combination. Implicit in this requirement is that the service is able to uniquely identify the device at least from others that the user may have previously used.

Various techniques have been employed to determine whether a device has been used with a particular username and password combination to access a service. As services are commonly accessed using some sort of a web browser, one such technique includes placing a file known as a browser cookie onto the device via the web browser's cache. The cookie may include a unique identifier or tag that the service generates, which the service may then request upon a subsequent login. If the cookie is not present or otherwise inaccessible, the service may initiate additional authentication or deny access. Upon confirmation of the additional authentication or approval of access, the service will generate the cookie and provide it to the browser for storage and subsequent use.

One problem with this approach is if a user wipes their browser's cookies or switches browsers, the service will be unable to match the device with the user's username and password combination, and so will either again require additional verification, or will require the device to be approved for access again. A similar scheme may be used with mobile devices that utilize a dedicated app. The app may be provided with a file, cookie, or another marker following additional authentication which serves much the same function as a browser cookie. As with clearing a browser cache, wiping the app's data and/or cache (as may be done if the app needs to be reinstalled or reset) may cause the device to become unrecognized and additional authentication steps being required.

The various embodiments discussed herein may help avoid these problems. Disclosed herein are systems and methods for tracking and managing devices interacting with a service such as a cloud service, database system, multi-tenant system, or similar such on-line provider. Upon a successful initial attempt to log on to a service with a given username and password combination, the service may initiate a fingerprinting process upon the device. During the fingerprinting process, various vectors that can form a unique identifier (ID) or fingerprint of the device may be captured by the service and processed into a unique ID or fingerprint that reversibly captures the various vectors. This ID or fingerprint may be stored by the service, such as with or associated to the username and password entry, so that it may be easily referenced on subsequent login attempts.

Each time the user logs into the service on the device, the device's ID or fingerprint is obtained and compared to the ID or fingerprint stored by the service. During the comparison process to determine if the ID or fingerprint obtained from a device matches the stored ID or fingerprint, each of the various vectors may be individually compared. To address the possibility that the configuration of a device may change over time. e.g. upgrades or changes to a browser, operating system upgrades, hardware upgrades or modifications, etc., but possibly in relatively minor ways, each of the vectors forming the fingerprint may be assigned a weight. The weight of each vector may be used during the comparison process to create a match percentage across all compared vectors. Vectors that may be subject to relatively minor and/or frequent changes may be assigned a lower weight, so that changes that result in no match on such vectors have a correspondingly lower impact on the overall match percentage.

If the match percentage exceeds a predetermined threshold, then the device is considered to be recognized and/or identical to the device previously stored by the service. The device may be allowed to access the service on the basis of any permissions associated the username and password without needing further authentication. The matched device may further be tracked and/or managed on the basis of the match. Conversely, if the match percentage is below the predetermined threshold, the device may be considered to be new or different, and access to the service may be prevented or limited, possibly subject to additional authentication measures (e.g. two-factor authentication), or approval by an administrator of the service. Further, the fingerprint or ID generated for the unrecognized device may be associated and stored with the username and password, possibly pending administrative approval, allowing the device to be tracked and/or full access on future logins.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

As used herein, the terms "resource," "computing resource," "hardware resource," etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. As used herein, the term "network resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application. Moreover, the term "resource" may refer to the particular resource being accessed or an address or other means of accessing the resource.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include HTML. Extensible Markup Language (XML), Java Script Object Notion (JSON), Cascading Stylesheets (CSS). JavaServer Pages (JSP), MessagePack™, Apache® Thrift, Abstract Syntax Notation One (ASN.1), GoogleX Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com®, IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

Figure 1B:
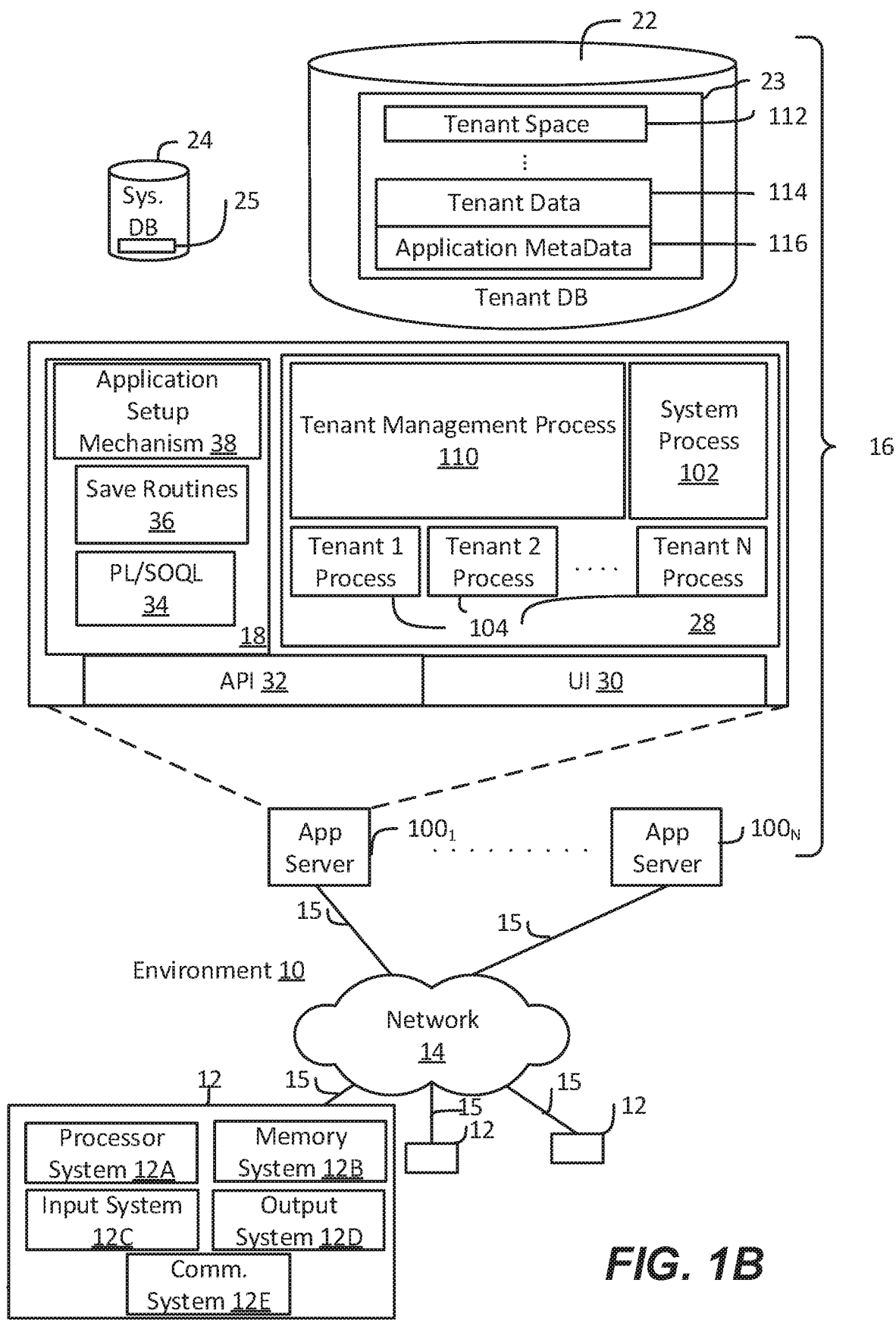
FIG. 1B shows a block diagram of example implementations of elements of FIG. 1A and example interconnections between these elements according to some implementations.

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN. LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies. Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for and tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols. Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various implementations, application platform 18 may be a development environment, programming language, and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 10) may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Device Fingerprinting, Tracking, and Management

Figure 2:
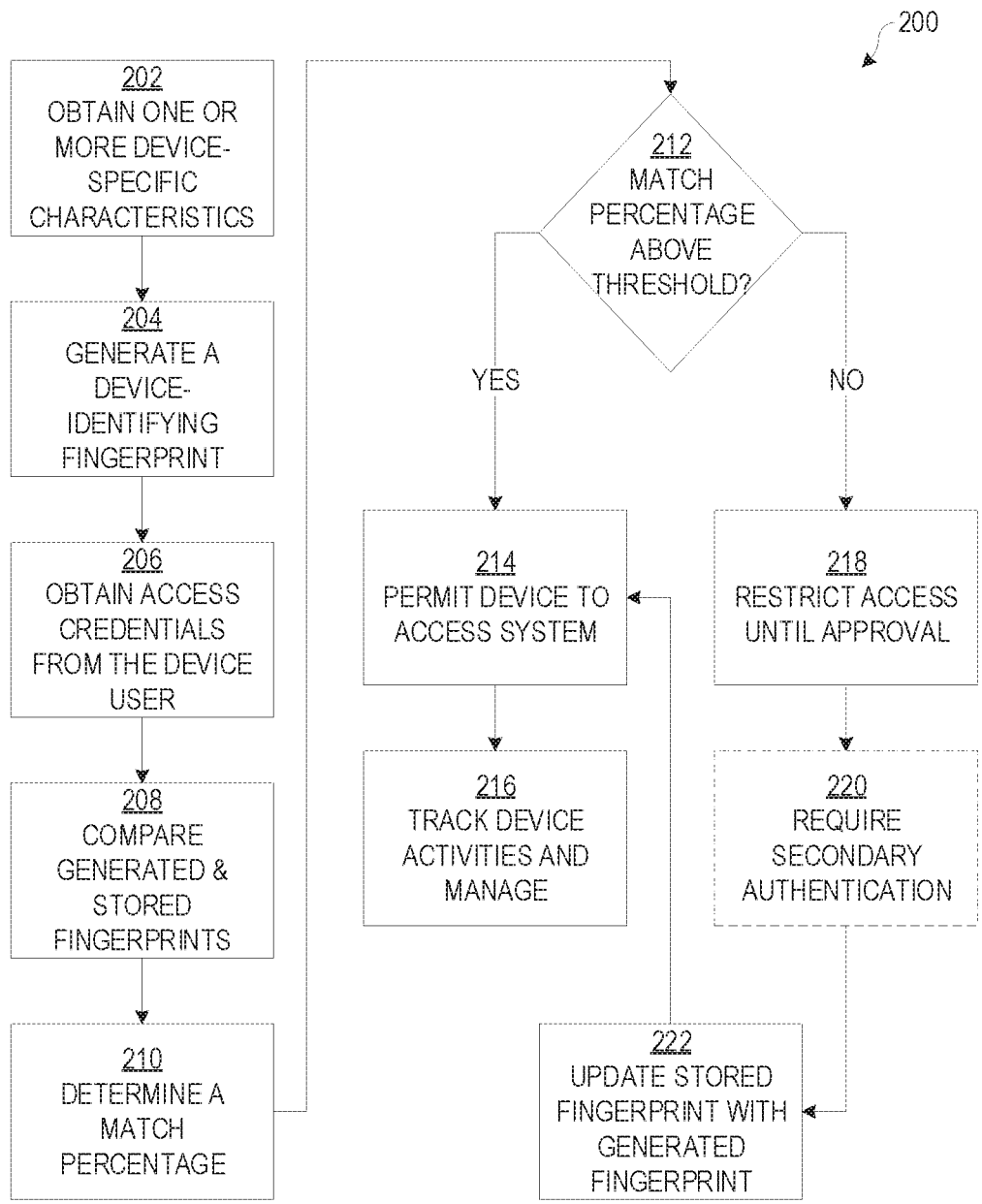
FIG. 2 is a flowchart of a method for fingerprinting, tracking, and managing a device, according to some implementations.

Referring to FIG. 2, a method 200 detailing the basic steps for device fingerprinting is depicted. Method 200 may be executed in whole or in part by or on various components of a cloud-based system, and/or by one or more application servers $100_{1-N}$ of a database system 16, including a multi-tenant system. In some implementations, method 200 may be used partially or wholly by a web application or applications (e.g. a cloud-based application or service), which may run in whole or in part on database system 16, including in multi-tenant implementations. Database system 16, as used herein, should be understood to also encompass any such web application or applications running in whole or in part of database system 16. In some implementations, portions of method 200 may be executed by database system 16, while the remaining portions may be executed by a device, such as user system 12 (hereinafter referred to as "device 12"). As used herein, "device" includes a computing device as defined above with respect to FIGS. 1A and 1B, including a mobile device such as a smartphone or tablet, a laptop, a desktop computer, or any other device capable of running a web browser or app that can interface with a remote or cloud service. In various embodiments, method 200 may be implemented with instructions stored upon a computer-readable medium. Method 200 may be executed in whole or in part each time a device 12 accesses database system 16, such access including where device 12 accesses a web application or applications running at least partially on database system 16.

Method 200 includes obtaining in block 202, in response to a connection request from a device 12, one or more device-specific characteristics. The connection request may depend upon the nature of both the device 12 and the specific implementation of database system 16. Some embodiments of database system 16 may offer multiple ways by which a device 12 can connect. For example, database system 16 may allow the device 12 to connect via a web browser, such as where device 12 is a computer such as a desktop or laptop. Where device 12 is a mobile device such as a tablet or smartphone, device 12 may connect via a dedicated application programming interface (API) by way of a dedicated application. The connection may be made between device 12 and database system 16 via any manner suitable to the nature of device 12, any software running on device 12, and/or database system 16. It should be appreciated that device 12 may connect to database system 16 via a dedicated app even when implemented as a laptop or desktop computer; likewise, device 12 may connect to database system 16 via a mobile web browser when implemented as a mobile device.

The one or more device-specific characteristics may include various vectors from which a fingerprint or a unique device ID may be derived. As used herein, "fingerprint", "unique ID", and "unique device ID" includes a device identifier obtained by profiling various vectors that include hardware and/or software characteristics of the device, e.g. by processing of data sets and/or algorithms that indicate the nature of the device hardware and software, and obtaining one or more hashes. The identifier allows positively identifying the specific associated device with a relatively high degree of confidence. Each vector may or may not, in and of itself, be capable of acting as a unique device ID. The fingerprint may be obtained by combining multiple vectors, as will be described further below.

Device-specific characteristics may include such vectors as platform, which may indicate the generic OS type of device 12, e.g. MacOS, Windows, Linux, etc.; color, which may indicate the available color space of device 12's graphics engine, e.g. 24 bit, 32 bit, color mode; time zone, which may indicate the particular time zone reported by device 12's operating system, browser, and/or other application; DRM, which may indicate available digital rights management schemes on device 12, such as may be supported by the operating system, various installed software, and/or a dedicated application for accessing database system 16; codec, which may include a list of available codecs on device 12 for interpreting various file types such as MP3, MP4, H.264, AVI, etc.; language, which may include the language or languages supported by a browser or application on device 12, and/or supported by the operating system of device 12; and user agent, which may include a string of information or other data appended to a browser or application request (such as the aforementioned connection request). The user agent may identify the generating application along with various bits of system information.

It should be appreciated that the foregoing list of vectors is only a list of possible vectors. The actual set of vectors used to generate a fingerprint may vary from embodiment to embodiment, and even from device 12 to device 12 for a given embodiment, depending upon the nature of device 12 and/or database system 16. For example, when device 12 is a computer accessing database system 16 via web browser, database system 16 may request a different set of vectors from the computer as opposed to when device 12 is a mobile device, possibly accessing database system 16 via a dedicated app. Moreover, different operating systems may support generation of a device vector or vectors that are highly hardware specific, and so may allow for a unique device ID or fingerprint that is comprised of only the OS-generated vector or vectors. Further, a given database system 16 may support a set of vectors from which a subset may be chosen specific to a given device 12 or class of devices 12.

In block 204, a fingerprint or unique ID may be generated from the device-specific characteristics. One or more of the various aforementioned vectors may be obtained by database system 16 from device 12. In embodiments, database system 16 may calculate a hash from each of the various vectors obtained from device 12, such as by using a hash function. In other embodiments, device 12 may compute one or more of the hashes and supply them to database system 16. For some vectors, database system 16 may supply some data to device 12 to transform, such as via one or more codecs, with the transform results being used to compute the hash. Following computing the various hashes, database system 16 and/or device 12 may concatenate the various hashes into a single string, which comprises the fingerprint or unique device ID. By concatenating the various vector hashes into a single string, the vectors can be later individually extracted for separate processing and comparison, as will be described further below.

In block 206, access credentials may be obtained from a user of the device. Access credentials may be a username and password combination, and/or some other authentication means, such as a biometric measurement, smart card, RFID tag, NFC device, access token or some other means or device for authenticating a user to allow access to database system 16. The database system 16 may store corresponding access credentials for the user, to which the suppled credentials may be compared. If no matching credentials are located, either due to the suppled username not being present on database system 16 and/or the associated password, token, or other authentication means being incorrect, the user may be denied access, and method 200 may end.

In some embodiments, a fingerprint or device ID may be generated prior to receiving the user credentials as per the order of blocks in FIG. 2. In such embodiments, the generated fingerprint or device ID may be only temporarily retained, pending the user successfully authenticating with access credentials to database system 16. If the user is not successfully authenticated, the fingerprint or device ID may be discarded or deleted. In other embodiments, the fingerprint or device ID may not be captured and generated until following positive authentication of the user. In still other embodiments, data for the various vectors used to generate the fingerprint or device ID may be obtained prior to authentication, but actual computation of the fingerprint may be delayed until the user is positively authenticated.

In block 208, following positive authentication, the generated fingerprint is compared with at least one stored fingerprint associated with the access credentials. A given set of access credentials may have one or more fingerprints or device IDs associated with it. For example, access credentials and associated device fingerprints may be stored in a tenant database 22 when method 200 is implemented on a multi-tenant system, as depicted in FIG. 1B. In another example, where a database system 16 is specified for a single controlling entity, the access credentials and associated device fingerprints may be stored in a single system-wide database for database system 16.

Where multiple fingerprints are associated with a single set of access credentials, such as where database system 16 allows a user to access database system 16 from multiple tracked devices 12, database system 16 may, in some embodiments, need to iterate through each associated fingerprint and compare it with the generated fingerprint to determine whether device 12 has a match. In other embodiments, database system 16 may employ various vectors to act as a sieve, to reduce the necessity of performing a full comparison of all vectors on each fingerprint. For example, the OS type vector, described above, or a vector tied to a hardware-generated or hardware-unique identifier may be useful as an initial test. A failure to match the vector may indicate a high likelihood that the generated fingerprint and stored fingerprint being tested will not sufficiently match, and allow database system 16 to move to comparing another fingerprint. In still other embodiments, where only a single fingerprint or a couple of fingerprints may be associated with a set of access credentials, a full comparison of each stored fingerprint with the generated fingerprint may be possible without incurring significant computing overhead.

Figure 3:
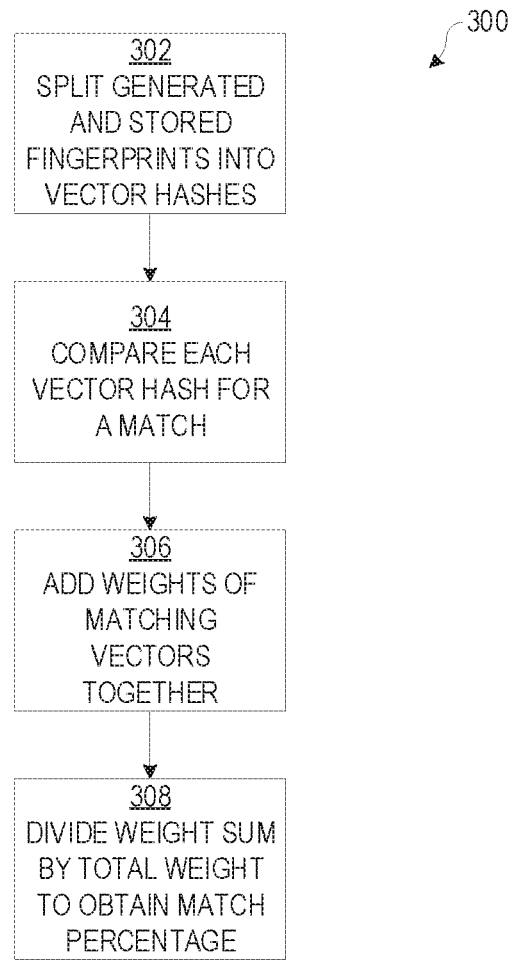
FIG. 3 is a flowchart of a method for comparing a generated fingerprint with a stored fingerprint, according to various implementations.

In block 210, a match percentage is determined. This match percentage may be assessed against a predetermined threshold in block 212. FIG. 3 depicts one or more possible actions of a method 300 that database system 16 may execute in comparing fingerprints and determining a match percentage. In block 302, the generated fingerprint and stored fingerprint to be compared may be split into their individual vector hashes. As discussed above, the fingerprint/device ID may be generated by a simple concatenation of each hash determined from the captured vectors. This concatenation may be readily reversed, allowing the hash for each individual vector to be retrieved.

Each vector may then be compared in block 304 to determine whether they match. The comparison may be a comparison for identical data, suitable to the nature of the hash. For example, if the hashes are numerical or a string type, the comparison may simply test whether the numbers or strings are identical, using a comparison operator or function, such as the C/C++ strcmp( ) function. Other comparisons may use bit-level operations, or other comparison functions or techniques according to the nature of the hash.

Each vector may be assigned a weight that may represent the relative importance of the vector in the overall fingerprint comparison process. Weights may be assigned on the basis of how likely a match on a given vector may indicate that the device 12 being fingerprinted is the same device that generated a given stored fingerprint. For example, a platform vector that reflects a device operating system, if matched, may be a stronger indicator of a device 12 match than a time zone vector, which could match across nearly any device 12 that is in the same geographic time zone as a device used to generate a given stored fingerprint. Accordingly, the platform vector may be assigned a greater weight than a time zone vector. Example vectors and associated weights (plus the weight total) are shown in Table 1, as follows:

TABLE 1

| Vector | Weight |
|---|---|
| Platform | 5 |
| Color | 3 |
| Time zone | 1 |
| Canvas | 2 |
| DRM | 3 |
| Codec | 5 |
| Language | 4 |
| User Agent | 7 |
| Total: | 30 |

Although each vector weight is a numerical value in the example depicted in Table 1, it should be understood that any suitable arbitrary value may be used to reflect weight that can be accorded a meaning for the relative importance of its associated vector. For example, in some embodiments, the weight may be stored in an alphabetic form, e.g. A, B, C, D, E, etc. indicating relative weight. Further, although the total weight of all vectors equals 30 in the example of Table 1, this likewise is simply one possible embodiment; the actual total of all weights need not add up to any particular value, so long as the values are useful to determine a match percentage, as will be described below.

For each vector hash that matches, in block 306, the weight assigned to each vector in the example of Table 1 may be summed together, in a manner appropriate to how the weight of each vector is stored (e.g. numeric, alphabetic, alphanumeric, etc.). From this sum a match percentage may be computed in block 308, by dividing the sum of the weights of matching vectors with the total weight of all vectors. For example, if the vectors of color, platform, codec, and language match between the generated fingerprint and a stored fingerprint, the total weight of matches would be 3+5+5+4=17. This match total is divided by the total weight of all vectors, shown in Table 1 as 30. Thus, the match percentage is 17/30=0.567 (rounded), or 56.7%.

Referring back to decision block 212 in FIG. 2, the calculated match percentage may be compared to a predetermined threshold. The predetermined threshold may be a predetermined percentage, such as 80% or 90%, above which device 12 can be considered to have generated the matching stored fingerprint or device ID with a high degree of confidence. The selection of the predetermined threshold may be made with consideration to the various vectors selected to generate the fingerprint. For example, if the selected vectors are predominantly directed to inherently unique device characteristics that are each unlikely to be matched by multiple devices 12, then a comparatively lower predetermined threshold for the match percentage may still yield a high confidence of a device match with a stored fingerprint. Conversely, a fingerprint generated from vectors likely to be matched across multiple devices may necessitate a comparatively higher predetermined threshold, e.g. above 90%, to ensure a high confidence of a device match.

In still other embodiments, a separate predetermined threshold may be associated with each stored fingerprint that may be unique to the particular fingerprint or device ID. Such an implementation may be useful if the vectors selected to generate the stored fingerprint may vary from fingerprint to fingerprint. For example, a device 12 that accesses database system 16 via a web browser may offer a set of vectors for fingerprint or ID generation that is different from the set of vectors selected for when device 12 is a mobile device accessing database system 16 via an app. In such embodiments, the predetermined threshold for a device 12 that accesses database system 16 via a browser may be different from the predetermined threshold for a device 12 that accesses database system 16 via an app.

Still further, vectors may be selected on the basis of a particular device 12's characteristics. For example, one set of vectors may be selected for a device 12 that runs Windows, and another set of vectors may be selected for a device 12 that runs macOS. These two sets of vectors may have some or no overlap, and may each have a different predetermined threshold for a match percentage.

If the match percentage is at or above the predetermined threshold (the "YES" path from block 212), then the device may be permitted to access at least a portion of the database system according to access permissions associated with the stored fingerprint, per block 214. These access permissions may have been previously set at a per user level, on a per device level, on an overall database system 16 level, or by some other suitable criteria as may be determined by the management of database system 16.

The device 12 and any activities associated with or through the device may be tracked and/or managed in block 216. Tracking may include keeping a log of times and/or locations of logins, nodes within database system 16 that are accessed, applications and/or data that are accessed, length of time of any type of access, or any other similar information. This activity information may be made available to the user and/or administration of database system 16. In some examples, this information may be automatically analyzed for patterns and potential pattern deviations, to assist in detecting and preventing unauthorized access to database system 16. Furthermore, if device 12 is reported as lost or stolen, the fingerprint may be used to deny any access to database system 16, even if valid user access credentials are supplied (e.g. where a user may have opted to have an app or browser on device 12 remember the user's login credentials). If location information is available from device 12, this information may be useful to law enforcement to aid in the recovery of device 12.

Further, in some examples database system 16 may periodically request fingerprint or device ID vectors from device 12 while device 12 is being tracked and/or managed in block 216, and a new fingerprint may be generated, or the existing fingerprint refreshed. If the generated fingerprint results in a match percentage below the predetermined threshold, then database system 16 may be triggered to update the stored fingerprint. This periodic polling may allow detection and tracking of vector changes to device 12 while device 12 is known and authenticated, and so reduce the likelihood of device 12 failing to match the stored fingerprint on a subsequent login. Database system 16, in connection with device 12, may schedule these periodic requests for when device 12 is relatively idle, so as to prevent unnecessary overhead on device 12 that may adversely affect device 12's performance.

If the match percentage is below the predetermined threshold (the "NO" path from block 212), then database system 16 may restrict access to database system 16 by device 12 in block 218. The level of restrictions may be established as a default policy by the administrator/operator of database system 16. In some examples, database system 16 may prevent further access, and may notify the user that administrator approval is needed before access to database system 16 is permitted through the device 12. In other examples, database system 16 may allow a partial access, e.g. read-only, limited to non-sensitive or confidential data, or some form of "guest" access. It should be recognized that the access restriction may be specific to device 12—the user may be able to obtain unrestricted access to database system 16 by accessing the system via another device that has previously been fingerprinted and validated to database system 16.

In some examples, in addition to or in lieu of an administrative approval of a device 12, a secondary authentication may be used, per block 220. Secondary authentication may be implemented as some form of two-factor authentication, where the user may need to authenticate their credentials through a known and trusted device or channel, or may be required to place a call or otherwise communicate to a designated agent of database system 16. This process may help assure that the device 12 has not been stolen, lost, or otherwise hacked. Following a successful secondary authentication, database system 16 may, in some embodiments, be configured to allow full access, and may designate the device 12 as a trusted device, as will be described in greater detail herein. In other embodiments, various aspects of the database system may optionally remain restricted in some fashion pending further administrative review and/or approval. Whether such restrictions are put into place, and/or the extent of such restrictions, may depend upon any administrative policies that may be established for the database system.

In block 222, following administrative approval and/or secondary authentication, the fingerprint or ID stored with the access credentials may be updated with the generated fingerprint, if the generated fingerprint varies from the stored fingerprint, viz. the match percentage from comparing the generated fingerprint with the stored fingerprint falls below the predetermined threshold. In some examples, database system 16 may be configured with a second predetermined threshold to allow database system 16 to distinguish between devices that may have been previously fingerprinted and authenticated, and new devices. A device that has previously been associated with a fingerprint or unique device ID, but has since had one or more vectors changed (e.g. a new browser is installed, a new operating system, hardware upgrade, etc.), may match only some device-specific vectors of a given stored fingerprint. A partial match may result in a device ID or fingerprint match percentage that does not exceed the predetermined threshold, but may still exceed a second predetermined threshold. The second predetermined threshold may be established at a level where there is confidence that the fingerprinted device 12 is likely to be identical to the device used to generated the stored fingerprint or device ID, but insufficient confidence to declare a match. If the unique device ID or fingerprint fail to meet even the second predetermined threshold, then the device 12 may be determined to be a new, previously unseen device.

In some embodiments, where the fingerprint or device ID exceeds the second predetermined threshold but not the first, and following any required administrative approvals of block 218 and/or secondary authentication in block 220 to grant device 12 full access, the stored fingerprint may be updated to the generated fingerprint. Updating may involve overwriting the stored fingerprint with the generated fingerprint. In other embodiments, updating may involve replacing only those vector hashes in the stored fingerprint with the corresponding hashes in the generated fingerprint that do not match, with the end result being a stored fingerprint or unique device ID that would generate a 100% match percentage with the generated fingerprint or device ID.

Finally, and possibly following any required administrative approval, the device may be permitted full or normal access to the database system in block 214, and may be tracked and/or managed as described in block 216.

Figure 4:
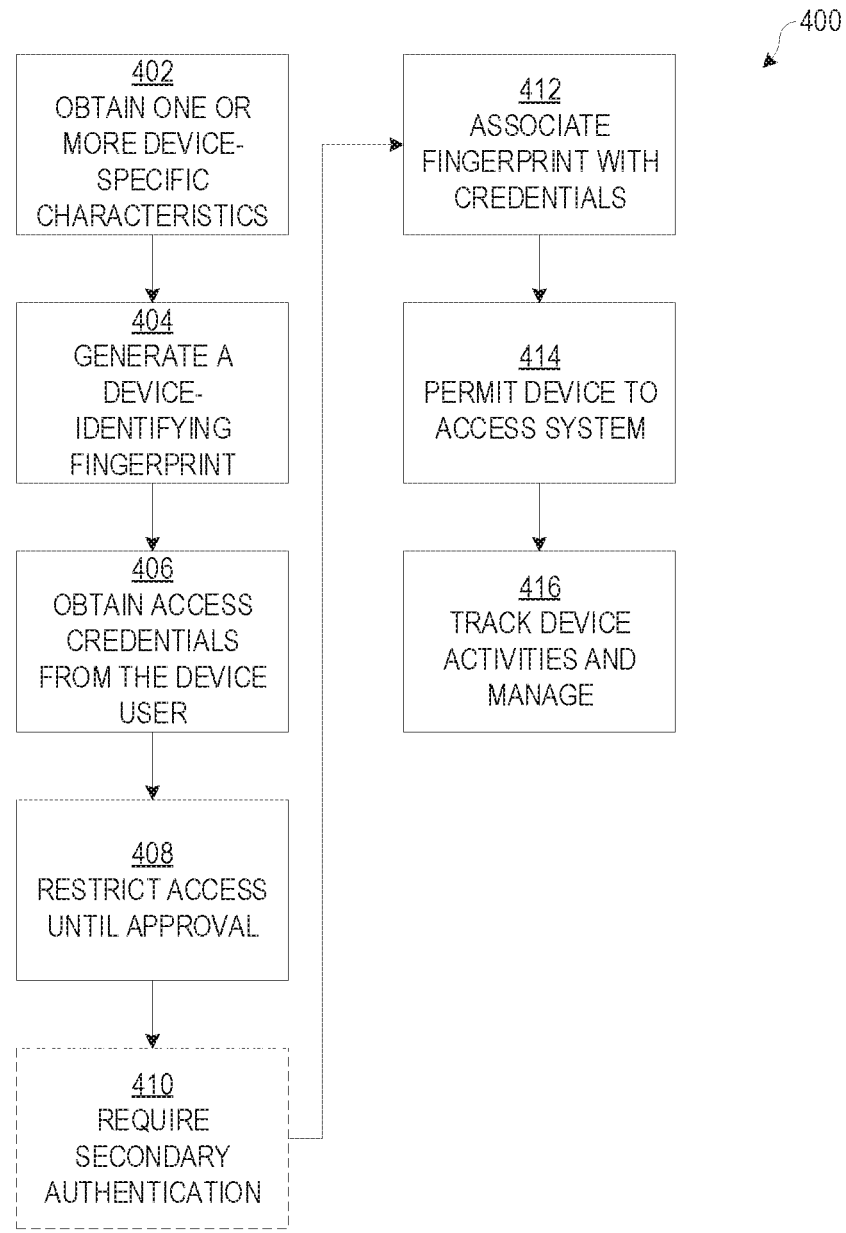
FIG. 4 is a flowchart of a method for fingerprinting and managing a device that has not been previously fingerprinted, according to various implementations.

Referring to FIG. 4, a method 400 that may be executed by database system 16 in whole or in part for dealing with a new device is depicted. Method 400 may be followed where a device 12 fails to meet both the predetermined threshold and, if established in a given embodiment, the second predetermined threshold, and it is determined that device 12 does not correspond to any stored fingerprint or unique device ID. Blocks 402 through 410 are essentially identical to blocks 202, 204, 206, 218 and 220 of FIG. 2. The comparison step, though omitted from FIG. 4, would be carried out following block 406 in accordance with block 208, and would result in the generated fingerprint failing to match any stored fingerprint or unique device ID.

In block 412, once the new device 12 has been authenticated and approved according to a given embodiment, the generated fingerprint may be associated with the user credentials, to create a new stored fingerprint or unique ID on database system 16. This newly created stored fingerprint may then be used for comparisons in subsequent access attempts by other devices. As disclosed above, the stored fingerprint may also have a predetermined threshold as well as possibly a second predetermined threshold that is selected with respect to the selected vectors used to generate the fingerprint or unique ID.

Following block 412, device 12 may be granted access in block 414. Device 12 may be managed and its activities tracked in block 414. It will be understood that blocks 412 and 414 correspond to blocks 214 and 216 of FIG. 2, and the reader is directed to the foregoing discussion of these blocks for the details.

Figure 5:
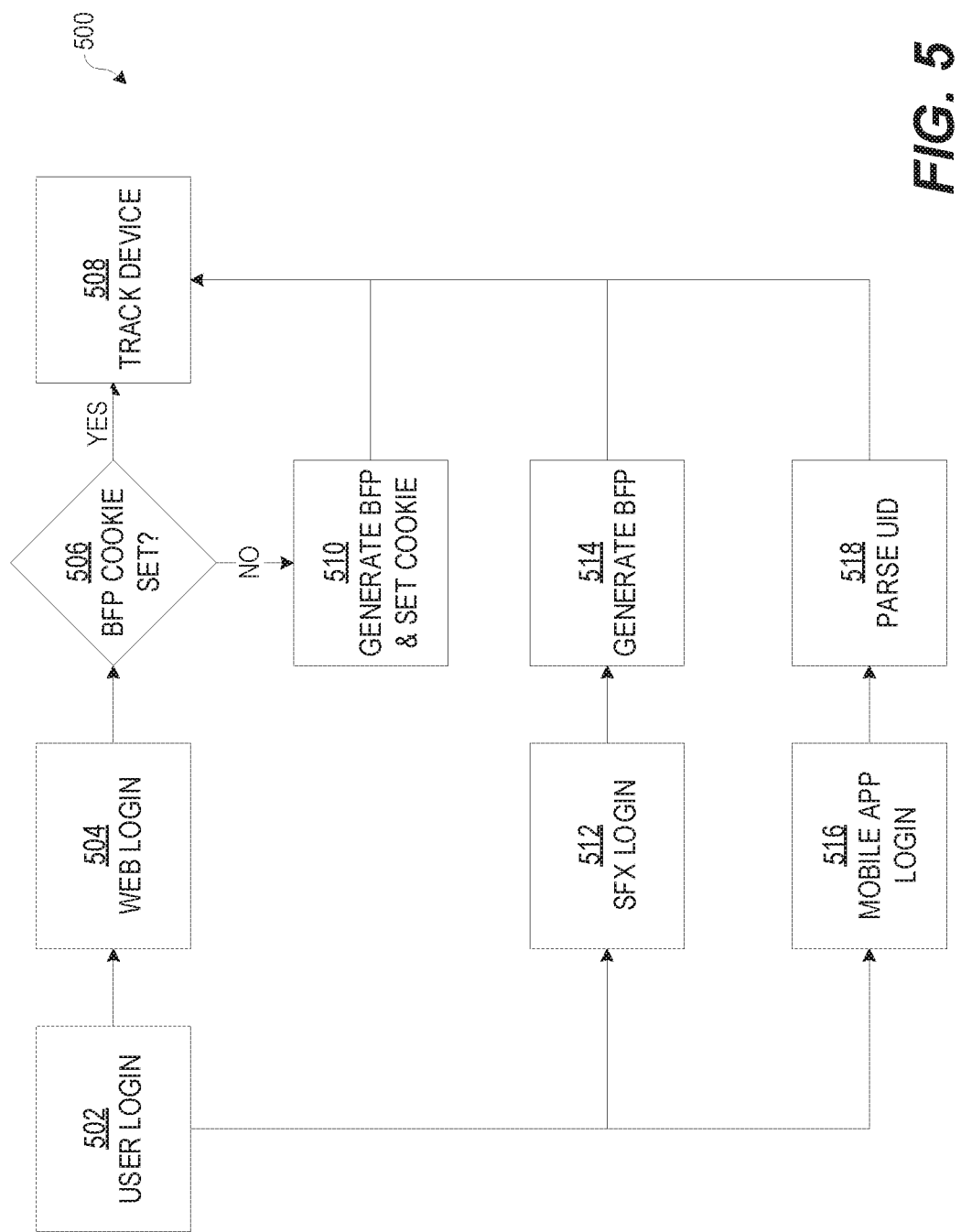
FIG. 5 is a flowchart of various login paths that may be taken by a system implementing device fingerprinting and management, according to various implementations.

As mentioned above, device 12 may access database system 16 in multiple ways. Method 500 of FIG. 5 outlines three different example login paths that a device 12 may take, and for which some or all blocks of methods 200 through 400 may be applied. Method 500 may be executed in whole or in part by a database system 16. Starting in block 502, a user may log on to database system 16 by supplying access credentials, as described above with respect to block 206. In block 504, device 12 may be a computer running a web browser, and the access credentials may be received via a web site login presented by database system 16. The web login may simply be a username and password field on an initial login screen in the web browser.

In block 506, database system 16 may query device 12, via its web browser, for the existence of a browser fingerprint (BFP) cookie associated with the web login. If existing, this BFP may include a previously generated fingerprint, which may be provided to database system 16 in lieu of generating a new fingerprint or unique device ID. By storing the fingerprint in the BFP cookie, overhead on device 12 may) be reduced, as it may be possible to retrieve the BFP from the cookie for comparison purposes, rather than regenerate a new unique ID or device fingerprint. The cookie may be stored via the browser's cookie storage mechanism, which may vary from browser to browser.

Provided the BFP exists (the YES branch from block 506), method 500 may advance to block 508, where device 12 is tracked, as will be described with respect FIG. 6 below. If, however, the BFP does not exist (the NO branch from block 506), then a new fingerprint or unique device ID may be generated according to FIG. 2, and set into a BFP cookie in block 510. Following setting of the BFP cookie, method 500 may advance to block 508, where device 12 will be tracked.

In block 512, a second example login path may be employed, using an SFX login. The SFX login may be a streamlined or alternative style of browser login. Rather than look for the existence of a BFP cookie in the browser as per block 506, in block 514 a BFP may be generated from requested vectors following each login, as described with respect to FIG. 2, and then the method may proceed directly to block 508. Such an example login may establish the BFP cookie as a temporary fingerprint, which may be retained for only a limited time, e.g. the duration of the user's session on database system 16.

In some examples, while blocks 506 and 514 consider generating or obtaining the BFP following a user supplying login credentials, in either case database system 16 may request fingerprint vectors (for generating the BFP) or the BFP cookie prior to the user completing the login process. Database system 16 (or device 12 on database system 16's behalf) may retain the fingerprint or BFP temporarily pending the user successfully logs in, and then delete the fingerprint or BFP if the user fails to successfully log in.

Block 516 presents a third example, where device 12 is a mobile device accessing database system 16 via an app. Following the device 12 connecting to database system 16 and possibly the user successfully logging on, device 12 may provide a unique ID or user ID to database system 16. A mobile device 12 may include operating system level support for supplying a device unique ID to database system 16 that can act as a fingerprint, rather than requiring capture of vectors and the generation of a fingerprint, as described above with respect to method 200 and FIG. 2. This device ID may be parsed in block 518 to extract a relevant fingerprint or unique ID portion (if the device ID includes additional information that is not relevant to a fingerprint), and the method 500 may then proceed to block 508. Alternatively, a fingerprint may be generated as described above, possibly with vectors being selected that are specific to the mobile nature of device 12 in the instant example.

Figure 6:
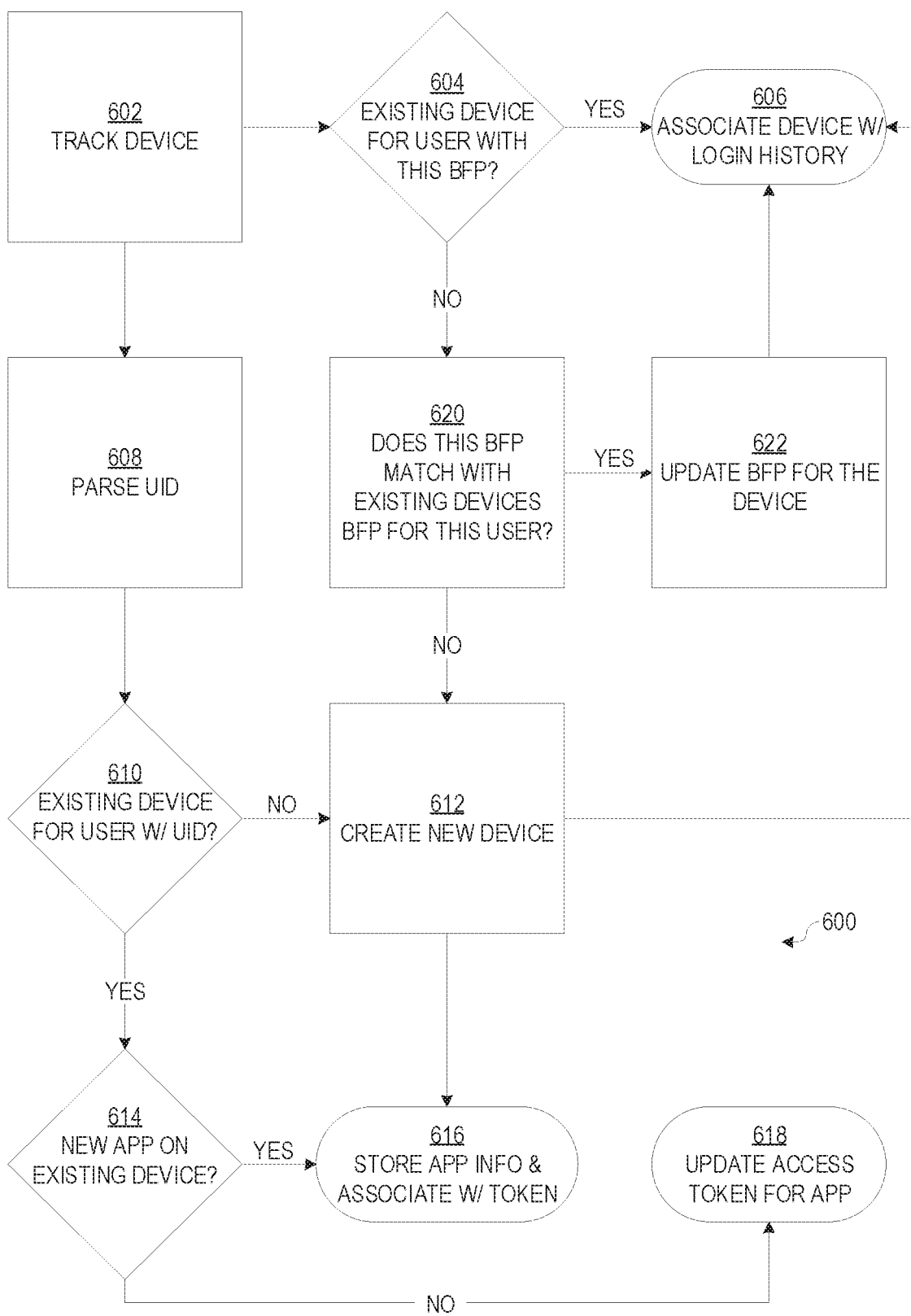
FIG. 6 is a flowchart of other possible fingerprint management actions that may be taken by a system implementing device fingerprinting and management, according to various implementations.

Turning now to FIG. 6, an example of how a device 12 may be tracked following login by a database system 16 via a fingerprint or unique device ID is depicted. Disclosed method 600 may be executed in whole or in part by database system 16. Starting in block 602, the tracking process for device 12 may follow a successful login by a user.

In block 604, the path followed for logins via blocks 504 and 512 of method 500, database system 16 may determine whether there is an existing stored BFP that matches a BFP provided by device 12 in blocks 506/510/514 and, if so (the "YES" path from block 604), any existing history that database system 16 may have corresponding to the stored fingerprint may be associated with the device 12, e.g. login history, access history, activity history, etc, in block 606.

If, however, the BFP does not match a BFP stored with the user's access credentials or there is no BFP stored on database system 16 (the "NO" path from block 604), the method 600 may proceed to block 620. Here, all devices that may be associated with the user credentials are examined to locate a possible match with existing fingerprints or unique device IDs, such as may be the case if device 12's browser cookies were previously cleared. In such a case, the device 12 may be determined to be trusted on the basis of the fingerprints' match percentage exceeding the predetermined threshold (the "YES" path from block 620). Alternatively, additional authentication or administrative permission may be required, as described with respect to methods 200 and 400. Method 600 may proceed to block 622, and the BFP stored in database system 16 may be updated. Depending upon the particular implementation, the BFP from the device may also be updated to the user's access credentials on database system 16. Following block 622, method 600 may proceed to block 606.

If, however, no existing device (fingerprint, unique ID, or BFP) is found associated with the user's access credentials that matches the device 12's generated fingerprint or BFP, following any required additional authentication or administrative permission, a new device entry may be created in block 612, and associated with the user's credentials for future access authentication. In block 616, an access token, such as a BFP or fingerprint, may be sent to device 12 for storage (e.g. block 510 of method 500) to assist in speeding up future access attempts. Method 600 may also proceed to block 606.

Where device 12 is a mobile device (block 516 of method 500), then method 600 may proceed to block 608, where the UID supplied by device 12 may be parsed to extract the relevant fingerprint or unique ID portion. Proceeding to block 610, database system 16 may determine whether the extracted UID or fingerprint matches to an existing device UID associated with the user credentials. If not (the "NO" path from block 610), the method 600 may proceed to block 612, as described above.

If the extracted UID or fingerprint matches to an existing device UID associated with the user credentials (the "YES" path from block 610), method 600 may proceed to block 614, where database system 16 determines whether a new app has been installed on recognized device 12. This may be determined, for example, if the UID matches, but the app being used to access database system 16 is not recognized, such as if a user agent vector is requested and does not match a previous user agent vector, or if no user agent vector is associated with the user's access credentials. Alternatively or additionally, the app may include a token, similar in function to a BFP; the presence or absence of a token may indicate whether the app has been previously used to access database system 16, or if it is a newly installed app. If the app is new on an existing device (the "YES" path from block 614), method 600 may proceed to block 616, as described above.

If, however, the app is not new on the device (preexisting, the "NO" path from block 614), method 600 may proceed to block 618. The app may have a preexisting token, but the token may be out of date, similar to a stale BFP. In block 618, the token may be refreshed or updated, such as with any vectors or unique device ID that may be stored associated with the user credentials on database system 16.

The specific details of the specific aspects of implementations disclosed herein may be combined in any suitable manner without departing from the spirit and scope of the disclosed implementations. Elements and features discussed in any of the previously discussed example embodiments may be used anywhere in one or more other embodiments unless explicitly stated otherwise. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. As an example, one or more general purpose processing device(s) may be transformed into a special purpose processor configured to perform any of operations described herein responsive to accessing instructions stored in an electronic memory or computer-readable media. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A non-transitory computer readable medium (NTCRM) comprising instructions that, when executed by at least one processor, are operable to cause a server to:
    obtain, in response to a connection request from a device, access credentials from a user of the device and a plurality of device-specific characteristics of the device;
    generate a fingerprint that identifies the device by hashing each device-specific characteristic of the plurality of device-specific characteristics separately from each other device-specific characteristic of the plurality of device-specific characteristics;
    compare each hashed device-specific characteristic of the generated fingerprint with a corresponding hashed device-specific characteristic of at least one stored fingerprint associated with the access credentials to determine a match percentage, the at least one stored fingerprint being generated in response to another connection request; and
    establish a session with the device when the match percentage exceeds a predetermined threshold.

2. The NTCRM of claim 1, wherein the predetermined threshold is a first predetermined threshold, and the instructions are further operable to update the stored fingerprint if the match percentage is below the first predetermined threshold but above a second predetermined threshold.

3. The NTCRM of claim 1, wherein the instructions are further operable to cause the server to: store the generated fingerprint and associate the generated fingerprint with the access credentials when there is no existing stored fingerprint associated with the access credentials.

4. The NTCRM of claim 1, wherein the instructions are further operable to cause the server to: receive the connection request from the device through a mobile application operated by the device.

5. The NTCRM of claim 4, wherein the device-specific characteristics and a unique ID for the device are supplied by a software platform on the device.

6. The NTCRM of claim 1, wherein the instructions are further operable to cause the server to: receive the connection request from the device through a web browser operated by the device.

7. The NTCRM of claim 1, wherein the device-specific characteristics are contained in a browser cookie supplied by the device.

8. The NTCRM of claim 1, wherein to generate the fingerprint the instructions are further operable to cause the server to:
    generate a vector for each device-specific characteristic of the one or more device-specific characteristics;
    assign a weight to each generated vector;
    hash each weighted vector to generate a vector hash for each vector;
    concatenate each generated vector hash into a string; and
    use the string as the generated fingerprint.

9. The NTCRM of claim of claim 8, wherein the instructions are further operable to cause the server to:
    compare each vector hash of the generated fingerprint with a corresponding vector hash of the at least one stored fingerprint;
    add the weights of each vector together for those vectors where the vector hashes match; and
    compute a match percentage by dividing the added weights by a sum calculated by adding the weights of all vectors together.

10. The NTCRM of claim 1, wherein the instructions are further operable to cause the server to: store, in association with the generated fingerprint, one or more of a timestamp of when the connection request was sent by the device, location information of the device when the connection request was sent by the device, a timestamp of when the session is established, a timestamp of when the session is terminated, identifiers of applications accessed by the device during the established session, identifiers of data that are accessed by the device during the established session, a length of time of each application access, a length of time of each data access, and a length of time of the established session.

11. A method for fingerprinting a device by a server, the method comprising:
receiving, by the server, an access request from the device, the request including access credentials from a user of the device;
obtaining, by the server based on the access request, a plurality of device-specific characteristics of the device;
individually hashing, by the server, each device-specific characteristic of the plurality of device-specific characteristics to generate a unique fingerprint for the device;
comparing each hashed device-specific characteristic of the generated fingerprint with a corresponding hashed device-specific characteristic of at least one stored fingerprint associated with the access credentials to determine a match percentage; and
when the match percentage is greater than a threshold, establishing, by the server, a session with the device during which the device is permitted to access at least a portion of a subject of the access request according to access permissions associated with the access credentials or the stored fingerprint.

12. The method of claim 11, further comprising updating the stored fingerprint with at least a portion of the generated fingerprint.

13. The method of claim 11, further comprising: storing the generated fingerprint and associating the generated fingerprint with the access credentials when there is no existing stored fingerprint associated with the access credentials.

14. The method of claim 11, wherein:
each device-specific characteristic of the device-specific characteristics forming the generated fingerprint comprise a vector and a weight; and
the generated fingerprint comprises a string generated by hashing each device-specific characteristic and concatenating the hashes into the string.

15. The method of claim 14, wherein comparing the generated fingerprint with at least one stored fingerprint comprises comparing the hash of each device-specific characteristic of the generated fingerprint with a corresponding hash making up the stored fingerprint.

16. The method of claim 15, wherein the predetermined threshold may vary based upon the weight of the vector of each device-specific characteristic in the generated fingerprint that matches a vector of a corresponding hash in the stored fingerprint.

17. A system for fingerprinting and controlling a device, the system comprising:
a server; and
a storage system in communication with the server, the storage system to store device information, including access credentials and a stored fingerprint associated with the access credentials; and
the server is configurable to:
obtain, in response to a connection request from the device, a plurality of device-specific characteristics;
generate, from the plurality of device-specific characteristics, a fingerprint that identifies the device by hashing each device-specific characteristic of the plurality of device-specific characteristics separately from each other device-specific characteristic of the plurality of device-specific characteristics;
compare each hashed device-specific characteristic of the generated fingerprint with a corresponding hashed device-specific characteristic of the stored fingerprint associated with the access credentials to determine a match percentage; and
permit session establishment with the device when the match percentage exceeds a predetermined threshold.

18. The system of claim 17, wherein:
each device-specific characteristic of the device-specific characteristics forming the generated fingerprint comprises a vector and a weight; and
the generated fingerprint comprises a string generated by hashing each vector and concatenating the hashes into the string.

19. The system of claim 18, wherein the server is configurable to:
compare each hash of the generated fingerprint with a corresponding hash of the stored fingerprint;
add the weights of each vector together for those vectors whose hashes match the corresponding hash of the stored fingerprint; and
compute the match percentage by dividing the added weights by a sum calculated by adding the weights of all vectors together.

20. The system of claim 17, wherein the storage system further includes device activity history, and the system is to update the device activity history with device activities tracked during the established session.

* * * * *